United States Patent
Sarikaya et al.

(10) Patent No.: US 9,976,523 B2
(45) Date of Patent: May 22, 2018

(54) METHOD AND DIAGNOSTIC FACILITY FOR CHECKING HIGH-PRESSURE TANK VALVES, HIGH-PRESSURE TANK SYSTEM AND MOTOR VEHICLE WITH A HIGH-PRESSURE TANK SYSTEM

(71) Applicant: GM GLOBAL TECHNOLOGY OPERATIONS LLC, Detroit, MI (US)

(72) Inventors: Ayhan Sarikaya, Gimbsheim (DE); Andreas Jauss, Westernohe (DE); Thorsten Bender, Bischofsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 349 days.

(21) Appl. No.: 14/976,741

(22) Filed: Dec. 21, 2015

(65) Prior Publication Data

US 2016/0177857 A1  Jun. 23, 2016

(30) Foreign Application Priority Data

Dec. 22, 2014  (DE) .................. 10 2014 019 419

(51) Int. Cl.
| | |
|---|---|
| *G01M 15/09* | (2006.01) |
| *F02M 37/00* | (2006.01) |
| *F02M 21/02* | (2006.01) |
| *F02D 19/02* | (2006.01) |
| *G01M 17/00* | (2006.01) |

(52) U.S. Cl.
CPC ........ *F02M 37/0023* (2013.01); *F02D 19/025* (2013.01); *F02D 19/027* (2013.01); *F02M 21/0224* (2013.01); *F02M 21/0242* (2013.01); *F02M 21/0293* (2013.01); *G01M 17/00* (2013.01); *Y02T 10/32* (2013.01)

(58) Field of Classification Search
CPC ..... Y02T 10/32; F02D 19/027; F02D 19/022; F02D 19/025; F02D 41/221; F02M 21/0224; F02M 21/0242; F02M 21/0293; F02M 37/0023; G01M 17/00
See application file for complete search history.

(56) References Cited

U.S. PATENT DOCUMENTS

| 5,611,316 A * | 3/1997 | Oshima .............. F02M 21/0224 123/494 |
| 6,041,762 A * | 3/2000 | Sirosh .................. B60K 15/013 123/529 |
| 6,401,698 B1 * | 6/2002 | Yamazaki .......... F02D 41/0027 123/529 |

(Continued)

FOREIGN PATENT DOCUMENTS

EP          2287458 A2     2/2011

OTHER PUBLICATIONS

German Patent Office, German Search Report for German Application No. 102014019419.1, dated May 3, 2016.

*Primary Examiner* — Freddie Kirkland, III
(74) *Attorney, Agent, or Firm* — Lorenz & Kopf LLP

(57) ABSTRACT

A method and diagnostic facility for checking a plurality of magnetic valves in a high-pressure tank system of a motor vehicle is described. A magnetic valve is activated for opening the magnetic valve. A pressure in a high-pressure tank system is measured while activating the magnetic valve. A valve is determined to be defective if during measuring the pressure a drop in pressure is found.

14 Claims, 4 Drawing Sheets

(56) References Cited

U.S. PATENT DOCUMENTS

| | | | |
|---|---|---|---|
| 6,467,466 B1* | 10/2002 | Maekawa | F02D 41/0027 123/198 D |
| 6,840,089 B2* | 1/2005 | Docy | G01M 3/3209 340/605 |
| 7,079,021 B2 | 7/2006 | Snowbarger et al. | |
| 7,575,012 B2* | 8/2009 | Miki | F17C 5/007 137/1 |
| 8,056,418 B2 | 11/2011 | Kiesbauer et al. | |
| 8,443,820 B2* | 5/2013 | Ulrey | F02M 21/0224 137/1 |
| 8,662,106 B2 | 3/2014 | Reumschussel et al. | |
| 9,032,984 B2* | 5/2015 | Ulrey | F02M 21/0224 137/1 |
| 9,624,873 B2* | 4/2017 | Bleyer | F02D 41/22 |
| 2002/0100314 A1 | 8/2002 | Docy et al. | |
| 2006/0246177 A1 | 11/2006 | Miki et al. | |
| 2010/0307454 A1 | 12/2010 | Ulrey et al. | |

* cited by examiner

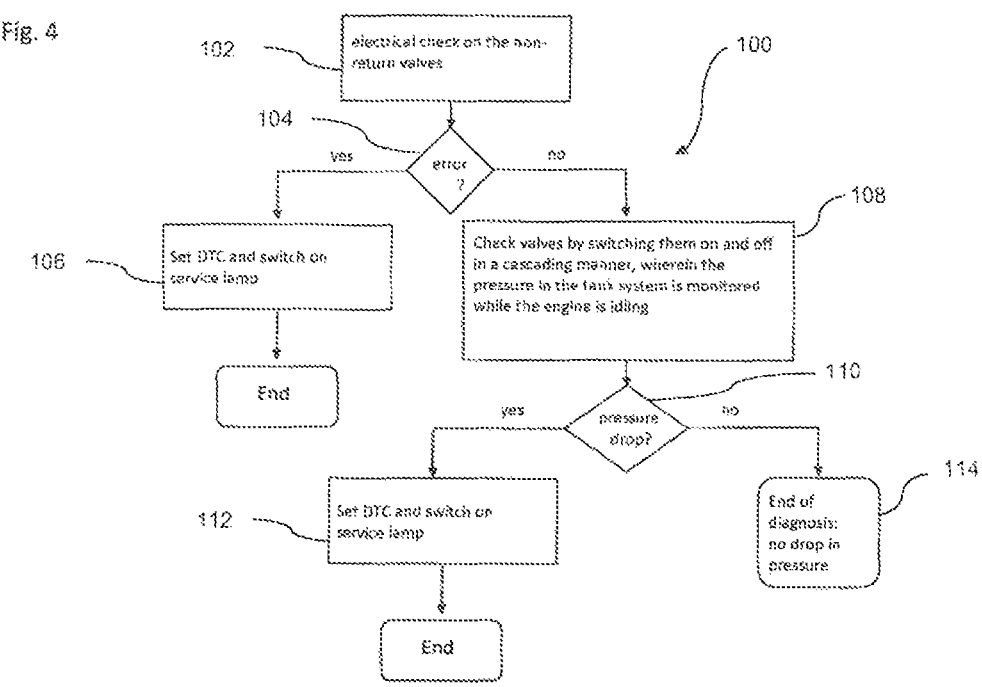

METHOD AND DIAGNOSTIC FACILITY FOR CHECKING HIGH-PRESSURE TANK VALVES, HIGH-PRESSURE TANK SYSTEM AND MOTOR VEHICLE WITH A HIGH-PRESSURE TANK SYSTEM

CROSS-REFERENCE TO RELATED APPLICATION

This application claims priority to German Patent Application No. 102014019419.1, filed Dec. 22, 2014, which is incorporated herein by reference in its entirety.

TECHNICAL FIELD

The present disclosure pertains to a method for checking high-pressure tank valves and a corresponding diagnostic facility including a high-pressure sensor for continuously measuring and/or monitoring a pressure present in the high-pressure tank system and a controller, wherein the controller is connected with the valves and the high-pressure sensor.

BACKGROUND

It is known to use alternative fuels for the operation of motor vehicles such as passenger cars, lorries and busses. In this respect, the use of compressed natural gas, in particular, has proven to be a practical and low-emission alternative in comparison to the operation with petroleum-based fuels. For the operation with natural gas, the motor vehicle carries a high-pressure natural-gas tank. The natural gas is delivered to combustion engine via a fuel supply system. Vehicles with natural gas tank systems or other high-pressure tank systems based on gaseous or liquefied fuels require special refueling facilities, such as provided for example in CNG ("compressed natural gas") or LPG ("Liquefied Petroleum Gas") filling stations.

Generally speaking the use of compressed gas due to the high pressures present in the tank system may involve hazards in case of damages or malfunctions. In order to avoid such hazards it has proven advantageous to safeguard the tanks against excessive temperatures and excessive pressures. The associated safety devices are, as a rule, arranged in the high-pressure tank valves. US 2010/0307454 A1 describes a method for distributing the fuel within a fuel system of a motor vehicle. The method is applicable to a tank system which includes a first fuel tank, in which the fuel is compressed to a first pressure, and a second fuel tank, in which the fuel is compressed to a second pressure, wherein the second pressure is higher than the first pressure. The method includes steps, in which fuel already filled into the second tank is fed into the first tank, and fuel is filled into the first tank and the second tank at the same time.

It is a requirement in the art to provide sufficient safety in respect of excessive pressures and temperatures for a high-pressure tank system of motor vehicles on the one hand, and on the other, to improve the profitability and efficiency of the safety devices to be used therein.

SUMMARY

To this effect the present disclosure provides a method and a diagnostic facility for checking high-pressure tank valves, for a high-pressure tank system, and for a motor vehicle with a high-pressure tank system. According to one aspect of the present disclosure a method for checking a plurality of magnetic valves in a high-pressure tank system includes is provided. A valve is activated for opening the valve. A pressure in a high-pressure tank system is measured while activating the valve. An evaluation of the valve is made to determine if the valve is defective by measuring the pressure and noting when the pressure is found to have dropped. This makes it possible to identify the presence of one or more high-pressure tanks, so-called blind high-pressure tanks, which can no longer be emptied due to a valve defect. Furthermore it is now possible to directly select during a check, which valve is affected and has a defect. Thus, in comparison to conventional methods, this method is a way of eliminating any weaknesses regarding a temperature deviation during a check on the valves. This can be achieved without having to develop any complex software algorithms for this purpose.

The method can be carried out in connection with a high-pressure tank system in a motor vehicle, while the high-pressure tank system supplies fuel to the combustion engine of the motor vehicle and the combustion engine is in idling mode. In this way the triggering of a high-pressure safeguard of the high-pressure tanks of the motor vehicle can be limited to absolutely necessary cases. Further the procedural steps of activating, measuring and determining can be carried out for each valve.

Preferably an error code (DTC) is stored in a controller of the high-pressure tank system and/or a service signal is issued, in case it is determined that a valve is defective.

The valves may be activated according to a certain predefined order, preferably sequentially. More clearly expressed the valves can be switched on and off in cascading fashion. By using this method diagnosing a blind tank can be considerably simplified, in particular in comparison to older diagnostic methods, which typically must be continued for several driving cycles in order to recognize a defective magnetic valve. In comparison to conventional methods this is a simpler and reliable method of preventing the tripping of an external overpressure protection of a blind high-pressure gas tank if such a tank is present.

With this method it is possible to determine that the respective activated valve is intact, should no pressure loss be found when taking pressure measurements. To this end the method can advantageously make use of the sensors existing anyway in the high-pressure gas system and/or the existing information, which is stored in a corresponding controller such as the engine controller.

Preferably the method may be divided into two processes or diagnostic sections. In particular the method, in a first diagnostic section, may include steps of electrically checking the valves. Then, as a second diagnostic section, the above mentioned checking of the valves may be carried out by activating a valve and measuring a pressure in the high-pressure tank system. The second diagnostic section is thus carried out when no malfunction was found during a preceding electrical check of the valve. The above-described method is suitable, particularly advantageously, for use in conjunction with the use of electromagnetic non-return valves, which are checked by a diagnostic facility.

According to one aspect of the present disclosure a diagnostic facility is also provided for checking the function of valves of a high-pressure tank system. The diagnostic facility includes a high-pressure sensor configured to measure the pressure in the high-pressure tank system and a controller in communication with the valves and the high-pressure sensor. The controller is configured to determine from a pressure signal of the high-pressure sensor, whether a loss of pressure exists in the high-pressure tank system, and to selectively activate the valves, and in parallel to activating the respective valve, to measure the pressure in the high-pressure system with the high-pressure sensor. Further, the controller is adapted to determine whether the activated valve is defective or not defective. If in response to activating the valve no loss of pressure is found, or a finite loss of pressure is found in response to activating the valve, it is determined that the activated valve is intact.

According to one aspect of the present disclosure, a high-pressure tank system is also provided, which includes at least two high-pressure gas tanks each connected via an associated magnetic valve to a fuel line. The high-pressure tank system further includes a high-pressure sensor and a controller. The controller is connected with the magnetic valves and the high-pressure sensor, so that the magnetic valves can be operated by the controller and the high-pressure sensor can be read out by the controller. The controller is adapted to perform a functional test of the magnetic valves. A respective magnetic valve is actuated for opening the magnetic valve. The high-pressure tank system is continuously measured while activating the respective magnetic valve. The respective magnetic valves (12, 24) are determined to be defective if a loss of pressure is found during pressure measuring. It is understood that if during the functional test of the magnet valves a certain magnetic valve is activated in order to open, the other valves are closed/are not activated to open.

According to one aspect of the present disclosure a motor vehicle is also provided, which includes a combustion engine and a high-pressure tank system for supplying the combustion engine with fuel. The high-pressure tank system has a plurality of high-pressure tanks equipped with high-pressure valves, at least one high-pressure sensor and a controller for activating the high-pressure valves. Furthermore the controller of the high-pressure tank system is adapted to perform the method detailed herein. According to one embodiment of the present disclosure the high-pressure tank system is connected to a combustion engine of a motor vehicle.

The diagnostic facility may be arranged to activate the valves as specified by the method only then, when the combustion engine is in idling mode. To this end the diagnostic facility may be arranged to determine, as to whether the combustion engine is idling, thereby further providing for an efficient and, at the same time, reliable solution.

BRIEF DESCRIPTION OF THE DRAWINGS

The present disclosure will hereinafter be described in conjunction with the following drawing figures, wherein like numerals denote like elements.

FIG. 4 shows a flow diagram of a method for checking high-pressure tank valves, according to an embodiment of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
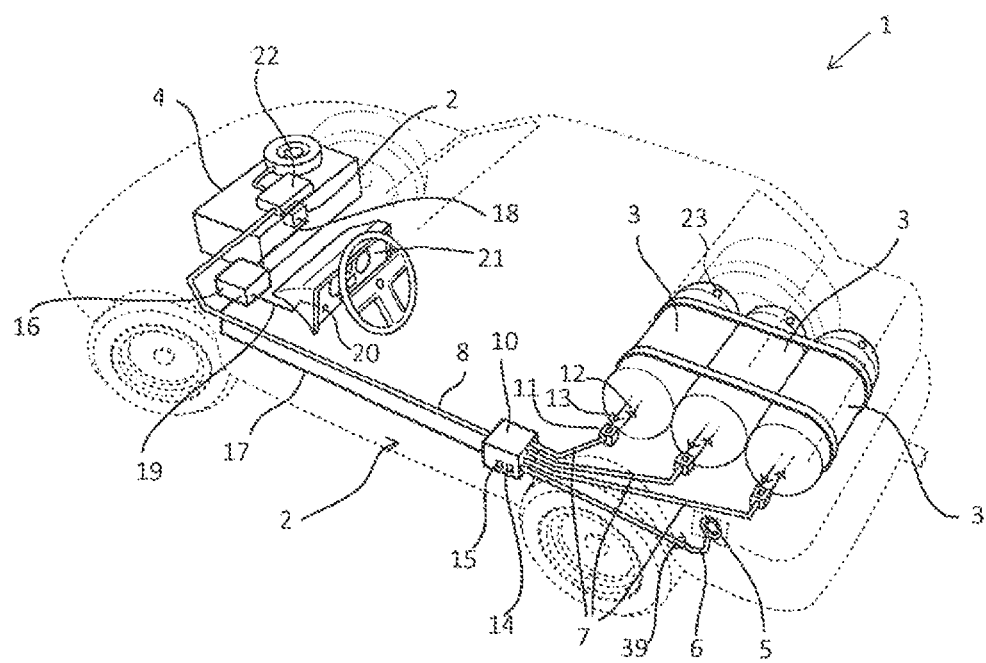
FIG. 1 shows a motor vehicle with a high-pressure tank system according to an embodiment of the present disclosure.

FIG. 1 shows a motor vehicle 1 with a high-pressure tank system 2, according to an embodiment of the present disclosure. The high-pressure tank system 2 includes a plurality of high-pressure tanks 3 (e.g., high-pressure fuel tanks 3) which are filled with compressed gas, such as natural gas or hydrogen, in order to provide a reservoir of fuel for the combustion engine 4 of the motor vehicle 1. Although in FIG. 1 precisely three high-pressure gas tanks 3 are shown as an example, the vehicle 1 may include a different number of high-pressure tanks 3. The high-pressure tanks 3 may be arranged in the area of the trunk of the vehicle 1 or below the floor. Furthermore the aspects of the present disclosure are not limited to a use of a certain type of gas or to high-pressure tanks filled with gas, but may be applied in conjunction with all suitable types of high-pressure tank systems, which respectively include a plurality of high-pressure tanks.

The high-pressure tank system 2 includes an inlet 5 for the fuel and a plurality of fuel lines 6, 7, 8. The fuel lines 6, 7, 8 are configured as high-pressure gas fuel lines and include a refueling line 6 connected with the inlet 5, a plurality of fuel lines 7 connected with high-pressure tanks 3, and a fuel line 8 connected with a fuel injector 9 of the combustion engine 4. Fuel injector 9 is configured to inject the gas fuel into the cylinders of the combustion engine 4. According to the embodiment shown here the fuel lines 6, 7, 8 are respectively connected at one end to a coupling 10 of the high-pressure tank system 2. The inlet 5 is typically equipped with a non-return valve 25, in order to avoid the fuel in the high-pressure tank system 2 from flowing out against the direction of flow during refueling of the vehicle 1. Further non-return valves may be optionally arranged behind the inlet 5 of the refueling line 6, which for better clarity are, however, not explicitly shown in this drawing.

Further valves 11, 12, 13 are present at each of the high-pressure tanks 3 in the high-pressure tank system 2, with which the gas flowing into the respective high-pressure tanks 3 or out of the high-pressure tanks 3 can be controlled. Each of the fuel lines 7 leading to one of the high-pressure tanks 3 has a magnetic valve 12 or a solenoid valve 12 and a non-return valve 13 arranged in it. The non-return valve 13 permits the gas to flow into the high-pressure pressure tank 3, enabling the fuel to be safely guided into the high-pressure tank 3. Refueling of the vehicle may be effected, in that the non-return valve 25 of the refueling line 6 and the non-return valve 13 on the high-pressure tank 3, due to the refueling mass current, are passed through in opening direction. The magnetic valve 12 opens in outlet direction of the high-pressure tank 3 and permits the withdrawal of fuel for operating the motor vehicle 1. To this end the magnetic valve 12 must be opened by means of electrical voltage. Although in FIG. 1 the non-return valve 13 and the magnetic valve 12 are shown separately, they can preferably be configured also as an electromagnetic non-return valve/magnetic valve provided with a non-return device or solenoid valve, which takes over both functions of the valves 12, 13. The valves 11, 12, 13 further include a manually operable valve 11, through which the gas can be discharged from the respective high-pressure tank 3.

The high-pressure tank system 2 includes a high-pressure sensor 14 and an optional temperature sensor 15. Based on the measured values of the high-pressure sensor 14, a blind tank diagnosis may be performed as explained further below.

The high-pressure tank system 2 further includes an electronic controller 16, which with the aid of electrical control lines 17 controls the high-pressure tank system 2 via control signals. To this end the controller 16 also drives the magnetic valves 12 and the fuel injector 9 via the control lines 17. Further the controller 16 reads the high-pressure sensor 14 and the temperature sensor 15. Further, via a line 19, the controller 16 controls an indicator 20, which is arranged on the instrument panel 21 of the vehicle and with which a service message can be output. Further the controller 16 of the high-pressure tank system 2 is connected via a communication bus 18 with a central control unit 22 of the motor vehicle 1. The central control unit 22 is preferably configured as an electronic control unit or ECU. Although in FIG. 1 the controller 16 and the central control unit 22 are shown separately, according to preferred embodiments of the present disclosure controlling the high-pressure tank system 2 or controlling and monitoring the magnetic valves 12 may be effected directly by means of the central control unit 22 or the ECU without a separate controller 16 being present.

The high-pressure tank system 2 is provided with a high-pressure safeguard, which has been designed in such a way as to ensure that in case any overpressure develops in the high-pressure tank system 2, this can be relieved. To this end the high-pressure safeguard preferably includes a bursting disc 23 at each high-pressure tank 3. The bursting disc 23 can also be directly integrated with the magnetic valves 12.

Figure 2:
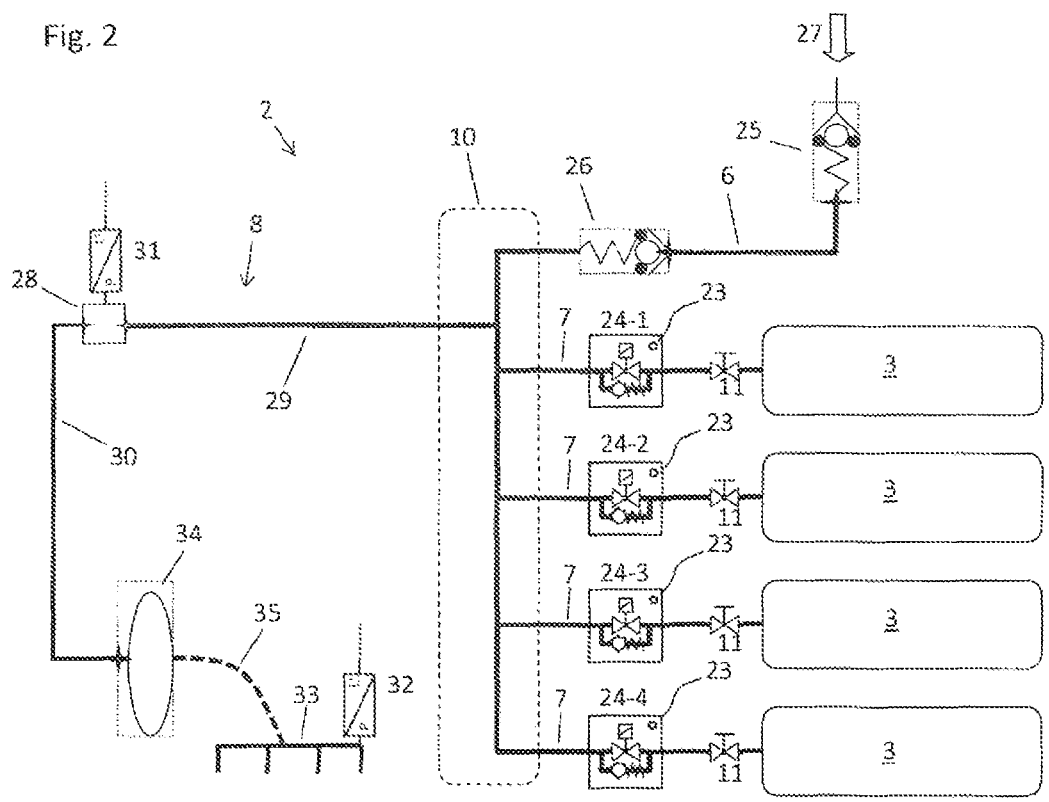
FIG. 2 shows a diagram of a high-pressure tank system of a motor vehicle according to an embodiment of the present disclosure.

FIG. 2 shows a diagram of a high-pressure tank system 2 of a motor vehicle 1, according to an embodiment of the present disclosure. FIG. 1, in comparison to FIG. 1, shows additional details of the high-pressure tank system 2. As with the motor vehicle shown in FIG. 1, the high-pressure tank system 2 shown in FIG. 2 includes a plurality of high-pressure tanks 3, which are filled via the refueling line 6 or the fuel lines 7 with, for example, compressed natural gas. The refueling line 6 has a first non-return valve 25 and a second non-return valve 26 arranged in it. Further each high-pressure tank 3 is equipped with an electromagnetic non-return valve 24/24-1 to 24-4 (generally: 24-1 to 24-n). The electromagnetic non-return valve 24 as per FIG. 2 corresponds to the non-return valve 13 and the magnetic valve 12 in FIG. 1. Furthermore in FIG. 2 the coupling 10 introduced in conjunction with FIG. 1, is shown here as a broken-line box.

During refueling the electromagnetic non-return valve 24 acts as a purely mechanical non-return valve 13. The direction of flow of the refueling mass current is indicated by an arrow in FIG. 2, the arrow being marked with reference symbol 27. When the vehicle is in operation, the electromagnetic non-return valve 24 is actuated by means of electrical voltage, thereby opening it and allowing the fuel to the supplied to the combustion engine 4.

FIG. 2 also shows a pressure regulator 28 which is arranged in the area of the fuel line 8. This has the effect of dividing the high-pressure tank system 2 into a high-pressure area 29 and a low-pressure area 30. The pressure regulator 28 is equipped with a high-pressure sensor 31. Further a low-pressure sensor 32 is provided in the low-pressure area 30. The low-pressure sensor 32 is arranged in the vicinity of a common rail fuel injection system 33, which injects the fuel into the combustion chambers of the combustion engine 4. The tank system 2 as per FIG. 2 also includes an oil separator 34, which is arranged in an area between the pressure regulator 28 and the fuel injection system 33. Between the oil separator 34 and the fuel injection system 33 the fuel line 8 is configured as a flexible fuel line 35.

If in the high-pressure tank system 2 an electromagnet of one of the electromagnetic non-return valves 23 is found to be defective, fuel withdrawal from the respective high-pressure tank 3 is no longer possible, because the valve can no longer be opened in flow-out direction of the high-pressure tank 3. Only refueling is still possible, as long as the valve can be opened purely mechanically as a result of the pressure difference.

A scenario will now be described as an example, which results in the functional chain described in simplified form below:

1. One of the electromagnets fails during the cold half-year of winter, resulting in the combustion engine 4 no longer receiving any fuel from the corresponding high-pressure tank 3.
2. This leads to a shorter range of the vehicle 1. If the driver then fails to have the high-pressure tank system 2 repaired, this means that in subsequent refueling sessions, the high-pressure tank of the vehicle as well will be filled via the defective electromagnet, but will never be emptied in operation.
3. The result is that the pressure level in the "blind" high-pressure tank continues to increase, which in particular may be due to the fact that during change-over to the warmer summer term (half-year) the filling stations raise the filling pressures via their temperature compensations. Furthermore filling pressures of filling stations may vary widely in some cases, and this may also play a big role.
4. If on hot summer days the vehicle is exposed to very high temperatures, the internal pressure of the never emptied "blind" tank may rise above the permissible level.

For such cases the high-pressure tanks 3 are all equipped with a bursting disc 23 as a high-pressure safeguard. It has become evident that the high-pressure safeguard trips correctly if an inadmissible pressure is present in one of the high-pressure tanks. Tripping of the high-pressure safeguard is connected with the entire tank content being emptied and released into the environment.

This event of the content being blown out into the environment is acoustically noticeable and, in the case of natural gas, connected with a distinct odor. Since the gas being released is a combustible fuel, this emptying of the tank content into the environment is not without risk. That is why in such a case the fire department is usually called, and the customer as the vehicle operator may be considerably confused.

The tripping of the over-pressure safeguard/bursting disc 23 is a correct way of dealing with this problem, because it protects the high-pressure tank against inadmissible over-pressures. Bursting discs tested and tripped in the laboratory have been shown not to have any abnormal properties such as prior damages, so that it could be assumed that the corresponding tripping pressures were in excess of a pressure threshold, e.g. 300 bar. The existence of an over-pressure safeguard such as a bursting disc 23, which opens towards the outside, must therefore be regarded as meaningful because in all cases these discs, if present, have prevented inadmissible over-pressures in the high-pressure tanks in all cases. It is not recommended to omit this external over-pressure safeguard since in that case—in unfavorable circumstances—there is the potential hazard that the high-pressure tank will burst. Relieving the gas pressure spring in such a way would be considered more hazardous than a controlled flowing-out of the fuel without a chemical reaction into the environment, which is the case when the over-pressure safeguard trips.

Figure 3:
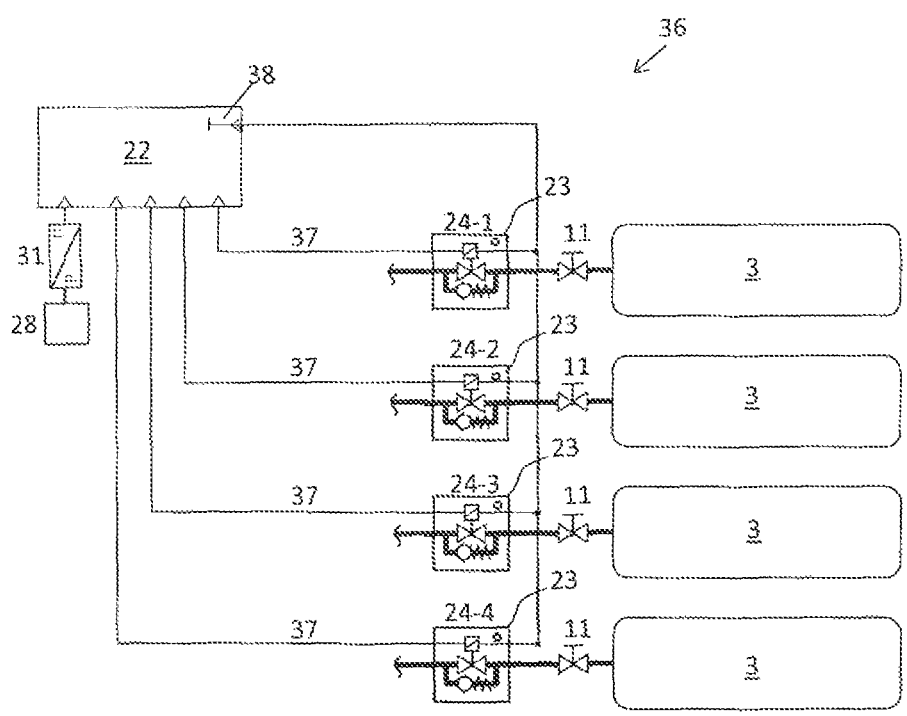
FIG. 3 shows a diagnostic facility for checking high-pressure tank valves, according to an embodiment of the present disclosure.

FIG. 3 shows a diagnostic facility 36 for the checking of high-pressure tank valves, in this case the electromagnetic non-return valves 24, according to an embodiment of the present disclosure. In FIG. 3 electronic components such as the central control unit 22 or the control unit 22 of the high-pressure tank system 2, are shown in more detail, whereas components which have already been explained with reference to FIGS. 1 and 2, and which are no longer dealt with in detail in FIG. 3, are not explicitly shown in FIG. 3.

As shown in FIG. 3, the control unit 22 includes various control ports, which are activated by the electromagnetic non-return valves 24. To this end the control ports of control unit 22 are each connected via an electric control line 37 with the electromagnetic non-return valves 24. The control lines 37 can also be used for performing a check on the non-return valves 24. Furthermore the control unit 22 is connected with sensors arranged in the high-pressure tank system 2, i.e. in particular with the high-pressure sensor 31 shown in FIG. 3. Also, the control unit 22 includes a mass input which provides a mass 38, and by means of which the electromagnetic non-return valves 24 are earthed on one side.

According to one aspect of the present disclosure the diagnostic facility 36 is adapted to detect a defective magnetic valve, here a defect in the electromagnetic non-return valves 24. Diagnosis is preferably performed by means of a software function, which performs a plausibility test during switch-on/switch-off of the magnetic valves. To this end the system pressure is measured by means of the high-pressure sensor 31. Preferably the electromagnetic non-return valves 24 can be switched on and off individually by means of the control unit, so that they can be controlled independently of one another. This enables the control unit 22 to immediately recognize a magnetic valve which doesn't open, and this will be explained further below.

To this end the control unit 22 is able to select different error symptoms during the electric check on the electromagnetic non-return valves 24 as part of a first diagnosis. The selectable error symptoms include a) short-circuit to battery or interruption of the feed line to the valve, b) short-circuit to mass, and c) intermediate contact/loose contact. If an error is detected during the electrical check, the control unit 22 causes the service lamp to switch on, which corresponds to the indication 20 shown in FIG. 1. The driver is requested to take the vehicle to a service workshop. The service workshop can read the error memory and replace the defective electromagnetic non-return valve.

The high-pressure tank system 2/the control unit 22 is also adapted to automatically start a second diagnosis, which is carried out if during the electrical check no error is detected. During the second diagnosis the electromagnetic non-return valves 24-1 to 24-4 are switched on and off one after the other, when the combustion engine 4 is idling. During this time only one of the valves 24-1 to 24-4 is kept open. With intact electromagnetic non-return valves 24-1 to 24-4 the gas pressure in the high-pressure tank system would be kept at the same level, because an adequate gas pressure continues to be supplied by the opened high-pressure tank 3. With a defective valve 24-1 to 24-4 however, the gas pressure would drop distinctly. This drop in pressure is detected immediately by the control unit via the high-pressure sensor 31. In this way the defective electromagnetic non-return valve 24-1 to 24-4 can be immediately spotted during the diagnosis, and as a result the indication 20 will light up and the error code will be set.

FIG. 4 shows a flow diagram 100 of a method for the checking of high-pressure tank valves 24-1 to 24-4, according to an embodiment of the present disclosure. In particular the method can be carried out in conjunction with the high-pressure tank 2 shown in FIGS. 1 to 3. Execution of the method steps is controlled by means of the control unit 22.

As shown in FIG. 4, in step 102 of the method, an electrical check is performed on the non-return valves 24-1 to 24-4. Further in step 104, a decision is taken, whether the electrical check resulted in an error being found in the electrics of the non-return valves 24. If this is the case, a corresponding DTC error code (diagnostic trouble code) is set in a readable memory of the control unit 22 (step 106), and the service lamp 20 is switched on. This is an indication to the driver to visit a service workshop, where the error code is read and the error eliminated. Steps 102-106 can be regarded as a first section of the process (method).

If the electrical check did not reveal an error, a further check is performed on the valves 24-1 to 24-4 in a second section of the process at step 108. To this end the combustion engine 4 must be idling. At the same time the pressure in the high-pressure tank system 2 is monitored by the control unit 22 by means of the high-pressure sensor 31. In step 110 it is determined, whether during sequential switching on and switching off a drop on pressure is detected in the high-pressure tank system 2 by means of the high-pressure sensor 31. If this is the case, it is determined in step 112, that the respective electromagnetic non-return valve 24 to be opened is defective and will fail to open. Therefore in step 112 the respective error code is set and the service lamp is switched on. If, on the other hand, no drop in pressure is detected, it is decided in step 114 that no error is present thus ending the diagnosis.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for the functional testing of magnetic valves of a gas tank in a high-pressure tank system of a motor vehicle, wherein the high-pressure tank system includes comprises at least two gas tanks, each of the gas tanks connected via an associated magnetic valve to a fuel line, the method comprising:
   activating a respective magnetic valve for opening the magnetic valve;
   continuously measuring a pressure in the high-pressure tank system while activating the respective magnetic valve; and
   determining that the respective magnetic valve is defective when a drop in pressure is found during measuring the pressure.

2. The method according to claim 1, wherein the high-pressure tank system supplies a combustion engine of a motor vehicle with fuel and wherein the method is performed while the combustion engine is idling.

3. The method according to claim 1, wherein each magnetic valve of the high pressure tank system is activated and measured, and the method further comprising determining that a magnetic valve is defective when a drop in pressure is found during measuring the pressure or that the magnetic valve is intact when no drop in pressure is found during measuring the pressure.

4. The method according to claim 3, wherein the magnetic valves are sequentially activated.

5. The method according to claim 1, further comprising storing an error code in a control device of the high-pressure tank system when the magnetic valve is determined to be defective.

6. The method according to claim 1, further comprising issuing a service indicator when the magnetic valve is determined to be defective.

7. A method for the functional testing of magnetic valves of a gas tank in a high-pressure tank system of a motor vehicle comprising a first diagnostic section for electrically checking the magnetic valves and a second diagnostic section according to claim 1, wherein the first diagnostic section includes activating a magnetic valve and measuring the pressure in the high-pressure tank system and proceeding to the second diagnostic section only when no malfunctioning is detected in the first diagnostic section.

8. A motor vehicle comprising a combustion engine and a high-pressure tank system for supplying the combustion engine with a natural gas fuel, wherein the high-pressure tank system comprises a plurality of high-pressure tanks equipped with high-pressure valves, at least one high-pressure sensor and a controller for activating the high-pressure valves which control is configured to perform the method according to claim 1.

9. A diagnostic facility for the functional testing of magnetic valves of a high-pressure tank system comprising:
a high-pressure sensor configured to measure a pressure in the high-pressure tank system; and
a controller operably connected with the magnetic valves and the high-pressure sensor and configured to:
determine a pressure drop is present in the high-pressure tank system from the high pressure sensor;
selectively activate the high-pressure valves and contemporaneously measure the pressure in the high-pressure tank system with the high-pressure sensor; and determine that the activated magnetic valve is defective when a drop in pressure is found in response to activating the magnetic valve; or
determine that the activated magnetic valve is intact when no drop in pressure is found in response to activating the magnetic valve.

10. The diagnostic facility according to claim 9, wherein the magnetic valves comprise electromagnetic non-return valves, which are sequentially switched on or off for checking by the diagnostic facility.

11. The diagnostic facility according to claim 9, wherein the high-pressure tank system is configured to connect with a combustion engine of a motor vehicle, and wherein the diagnostic facility is further configured to determine, whether the combustion engine is idling, and to perform activation of the magnetic valves for checking whether the magnetic valves are intact or whether one or more of the magnetic valves are defective when the combustion engine is idling.

12. A high-pressure tank system comprising:
at least two gas tanks, each of which is connected via an associated magnetic valve with a fuel line;
a high-pressure sensor; and
a controller connected with the magnetic valves and the high-pressure sensor and which configured to perform a functional test on the magnetic valves including:
activating of a respective magnetic valve for opening the magnetic valve;
continuously measuring a pressure in the high-pressure tank system while activating the respective magnetic valve; and
determining that the respective magnetic valve is defective when a drop in pressure is found during measuring the pressure.

13. The high-pressure tank system according to claim 12, wherein the controller is further configured to determine that the respectively activated magnet valve is intact if during measuring of the pressure no drop in pressure is found.

14. The high-pressure tank system according to claim 12, wherein the controller is further configured to sequentially activate the magnetic valves when functionally testing the magnetic valves.

* * * * *